(12) United States Patent
Doi et al.

(10) Patent No.: US 8,134,897 B2
(45) Date of Patent: Mar. 13, 2012

(54) CURRENT GAIN CONTROL SYSTEM

(75) Inventors: Akihiko Doi, Tokyo (JP); Shengyuan Li, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 44 days.

(21) Appl. No.: 12/622,586

(22) Filed: Nov. 20, 2009

(65) Prior Publication Data

US 2010/0315919 A1 Dec. 16, 2010

Related U.S. Application Data

(60) Provisional application No. 61/186,190, filed on Jun. 11, 2009, provisional application No. 61/186,223, filed on Jun. 11, 2009.

(51) Int. Cl.
*G11B 7/00* (2006.01)
(52) U.S. Cl. ............... 369/47.25; 369/13.26; 369/13.24; 369/47.5; 369/116; 369/124.01
(58) Field of Classification Search ............... 369/47.25, 369/47.5, 13.26, 13.24, 116, 124.01
See application file for complete search history.

(56) References Cited

U.S. PATENT DOCUMENTS

| 7,442,913 B2 * | 10/2008 | Fukuda et al. | ............ 250/214 A |
| 7,586,822 B2 * | 9/2009 | Chou et al. | ................. 369/53.44 |
| 2001/0038586 A1 * | 11/2001 | Gushima et al. | ........... 369/47.35 |

* cited by examiner

*Primary Examiner* — Wayne Young
*Assistant Examiner* — Linh Nguyen
(74) *Attorney, Agent, or Firm* — Dawn V. Stephens; Frederick J. Telecky, Jr.

(57) ABSTRACT

A current gain control system is described and comprises first and second gain blocks respectively associated with the first and second input channels, wherein first and second gain blocks transmit first and second gain signals in response to receiving first and second input signals; first and second converters adapted to be respectively coupled to the first and second gain blocks, the first and second converters operative for setting gains associated with the first and second input channel and for transmitting first and second converted signals in response to receiving the first and second gain signals; and first and second switches for selectively coupling the first and second converters to first and second channel drivers, respectively, wherein the first and second channel drivers transmit channel gain signals in response to receiving the first converted signal, and the channel gain signal allows control of the gain associated with the input channel.

20 Claims, 5 Drawing Sheets

CURRENT GAIN CONTROL SYSTEM

CROSS REFERENCE TO RELATED APPLICATION(S)

The present application claims priority to jointly owned U.S. Provisional Application corresponding to application No. 61/186,190 entitled, "Laser Diode Driver Current Input Signal Processing System." This provisional application was filed on Jun. 11, 2009. The present application also claims priority to jointly owned U.S. Provisional Application corresponding to application No. 61/186,223 entitled, "Current Gain Control System." This provisional application was filed on Jun. 11, 2009.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Optical disk drives have emerged as one viable solution for supplying removable high capacity storage. When these drives include light sources, signals sent to these sources should be properly processed to reduce potential damage in appropriate light emission.

BRIEF DESCRIPTION OF THE DRAWINGS

The current gain control system may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1A:
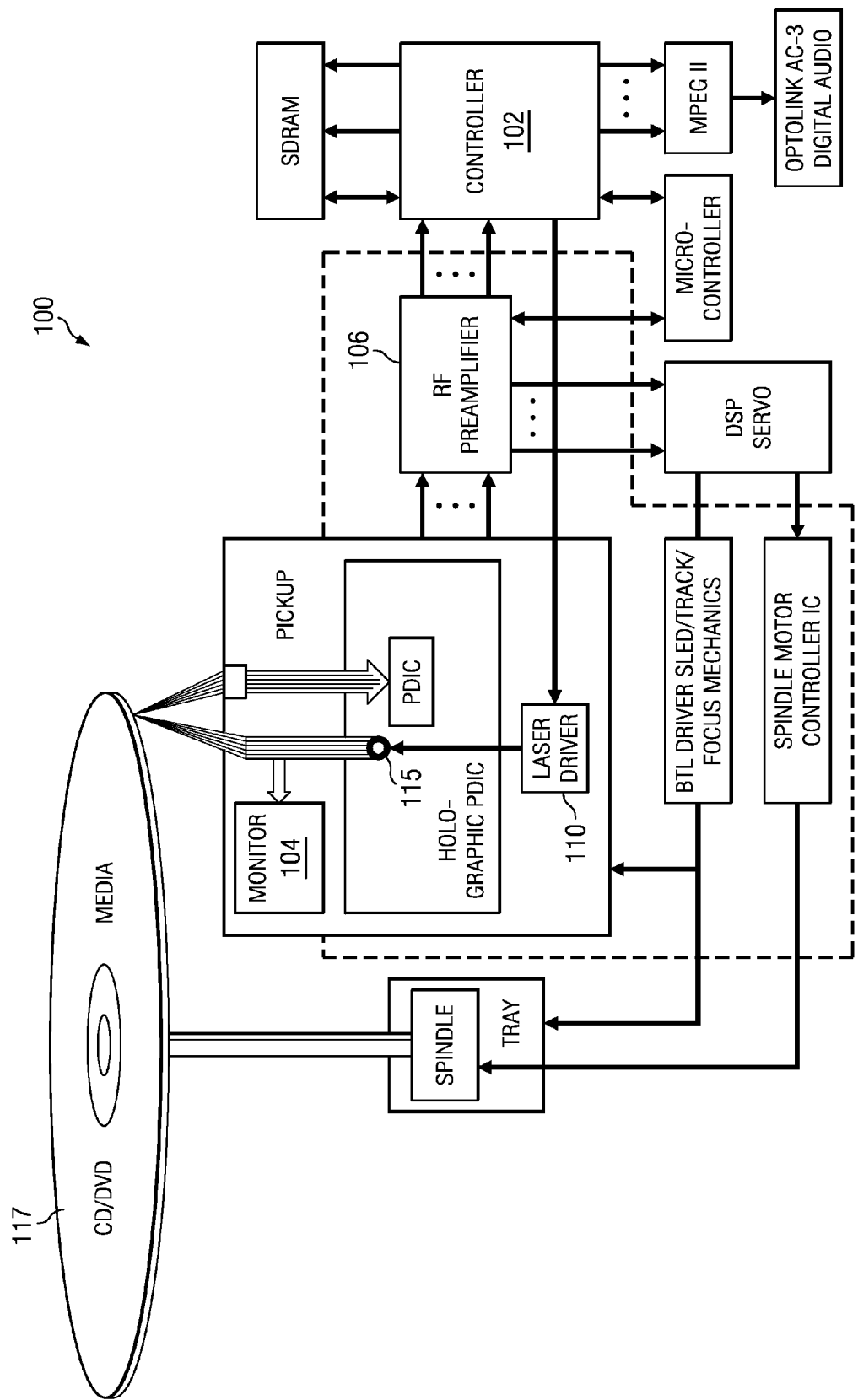
FIG. 1A, is a system drawing illustrating components within an optical disk drive.

While the current gain control system is susceptible to various modifications and alternative forms, specific embodiments have been shown by way of example in the drawings and subsequently are described in detail. It should be understood, however, that the description herein of specific embodiments is not intended to limit the current gain control system to the particular forms disclosed. In contrast, the intention is to cover all modifications, equivalents, and alternatives falling within the spirit and scope of the current gain control system as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Turning now to FIG. 1A, is a system drawing illustrating components within an optical disk drive 100. A controller 102 monitors the output light power level of a laser diode 115 using a Monitor PD 104, or monitor photodiode, and an RF, or radio frequency, preamplifier 106. This controller can keep an expected power level by changing an input control current of a laser driver 110 through an APC, or auto power controlling, feedback loop, even if a light source 115 such as a laser diode, has many changes of the output power due to various condition changes, such as temperature etc.

Also, the controller 102 sets the enable signal for switching some current channels of the laser driver 110, which arranges a data writing pulse. In the case of data reading, the controller 102 may only set the DC current by disabling the switching and applying the indicated input current. In the case of data writing, the controller 102 applies some adjustment signals, or enable-switching signals, to arrange the writing pulse waveform as a combination of switching timing, which also changes the power level by different indicated current of each channel. The controller 102 can arrange these indicated currents based on the Monitor PD 104 output with some detecting function in the RF preamplifier 106. At the very least, this controller has two controlling levels for the reading power and the writing power. Sometimes the controller may get the top, bottom, or average level of a writing pulse and calculate to control some power levels independently.

As illustrated in this figure, the laser driver 110 sends a signal that prompts an associated light source 115 (e.g., laser diode) to emit light. The light source 115 may emit light at any of a number of wavelengths (e.g., 400 nm, 650 nm, 780 nm). Light from this source contacts an associated optical media 117, such as a compact disc (CD), blue ray device (Blu-ray), or digital versatile disk (DVD). Light contacting the optical media can either facilitate data storage or data retrieval from the optical media 117.

Figure 1B:
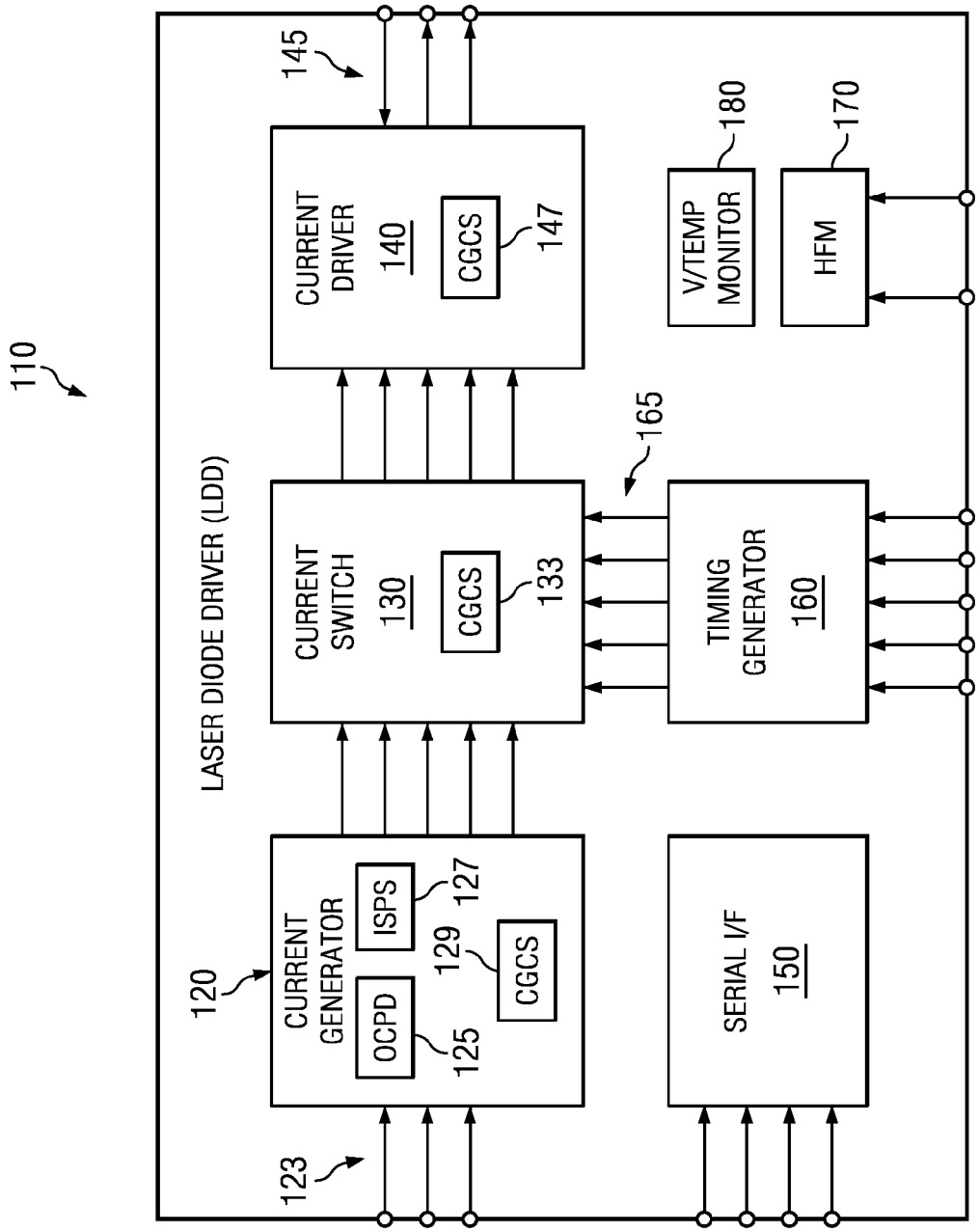
FIG. 1B is an environmental drawing including a laser diode driver current input signal processing system.

FIG. 1B is an enlarged view of the innovative laser driver 110, which may be a laser diode drive (LDD). The LDD 110 is an integrated, fully programmable, multi-function product that controls and drives laser diodes (e.g., light source 115) within optical drives as described with reference to FIG. 1A. More specifically, the LDD 110 can apply the current for the read, write, and erase removable high capacity disks capacities greater than approximately 50 Gbytes/disk). The LDD 110 also has low noise (e.g., noise of approximately 0.5 nA/rt-Hz), high speed (e.g., 1 Gb/s, 0.850 Gb/s) and high current (e.g., approximately 1 amp). Any numbers included in this application are for illustrative purposes only and numerous alternative implementations may result from selecting different quantitative values.

At a high level, the LDD 110 may include a current generator 120. Generally, the current generator 120 receives some input signals 123 associated with several input channels, which have an associated input current. This current generator 120 works in tandem with a current driver 140 and produces a gain for the input current. As a result, the current generator 120 and current driver 140 control the amount of current for each output channel 145. For the input signals that the current generator 120 receives, it transmits output signals that a current switch 130 receives. The current switch 130 decides which of the input channels should be turned on or turned off. For the channels that should be turned on, the current switch 130 makes those channels active. Similarly, the current switch 130 inactivates the channels that should be turned off and transmits output signals reflecting this change. The current driver 140 receives these output signals from the current switch 130 as input signals. The current driver 140 is the last current gain stage and drives the laser diodes directly.

In other words, the output signals from the current driver 140 also serve as output signals for the LDD 110, which are used in driving the lasers, or the light source 115 (see FIG. 1A).

In addition to the above-mentioned devices, the LDD 110 includes additional components. A serial interface (I/F) 150 has several inputs 155 (e.g., serial data enable, serial data, serial clock) that may be used for an enable, feature selection, or setting the gain. Like the serial interface 150, the timing generator 160 receives various channel enable inputs 165. Though there are five channel enable inputs that are shown in FIG. 1B, the LDD 110 may have any number of channel enable inputs, such as two, six, or the like. The timing generator 160 determines the time at which a given input channel will be either turned on or turned off. The LDD 110 also includes a high Frequency modulator (HFM) 170 and voltage/temperature monitor (V/Temp Monitor) 180. The HFM 170 modulates the output current for reducing mode-hopping noise of the laser diodes. The voltage/temperature monitor 190 monitors the laser diode voltage drop and on-chip temperature. One skilled in the art will appreciate that numerous alternative implementations may result from removing any or several of the blocks within the LDD 110.

Typical drivers do not have an independent setting or adjusting function for gain of each current channel. In contrast, the innovative LDD 110 includes current gain control system (CGCS) that allows independent control of gain for each input current channel. The CGCS generates current for the LDD 110 based on the current input and the current gain of each channel. This current is essentially the summation of all channel currents. Each channel's current is defined by the relation, "channel gain ratio x input current of channel." In the case of writing the information data on the optical media 117, the LDD 110 normally turns on with writing current.

In FIG. 1B, this CGCS is shown as having three different sections housed in different parts of the LDD 110, but an alternative implementation may include a different number of sections. More specifically, the current generator 120 includes a CGCS 129, while the current switch 130 includes a CGCS 133. The current driver 140 also includes a CGCS 147. With these three sections, the innovative CGCS is applicable to various types of disc, like CD, DVD, and Blu-ray, as well as various types of optical pick up units. For example, this CGCS may be applicable to any one of the following types of or address variations for the optical pick-up units slim drive and half-height drive. To accomplish this, the current gain for each channel may be changed by using a serial interface setting associated with the serial interface (I/F) 150.

Figure 2A:
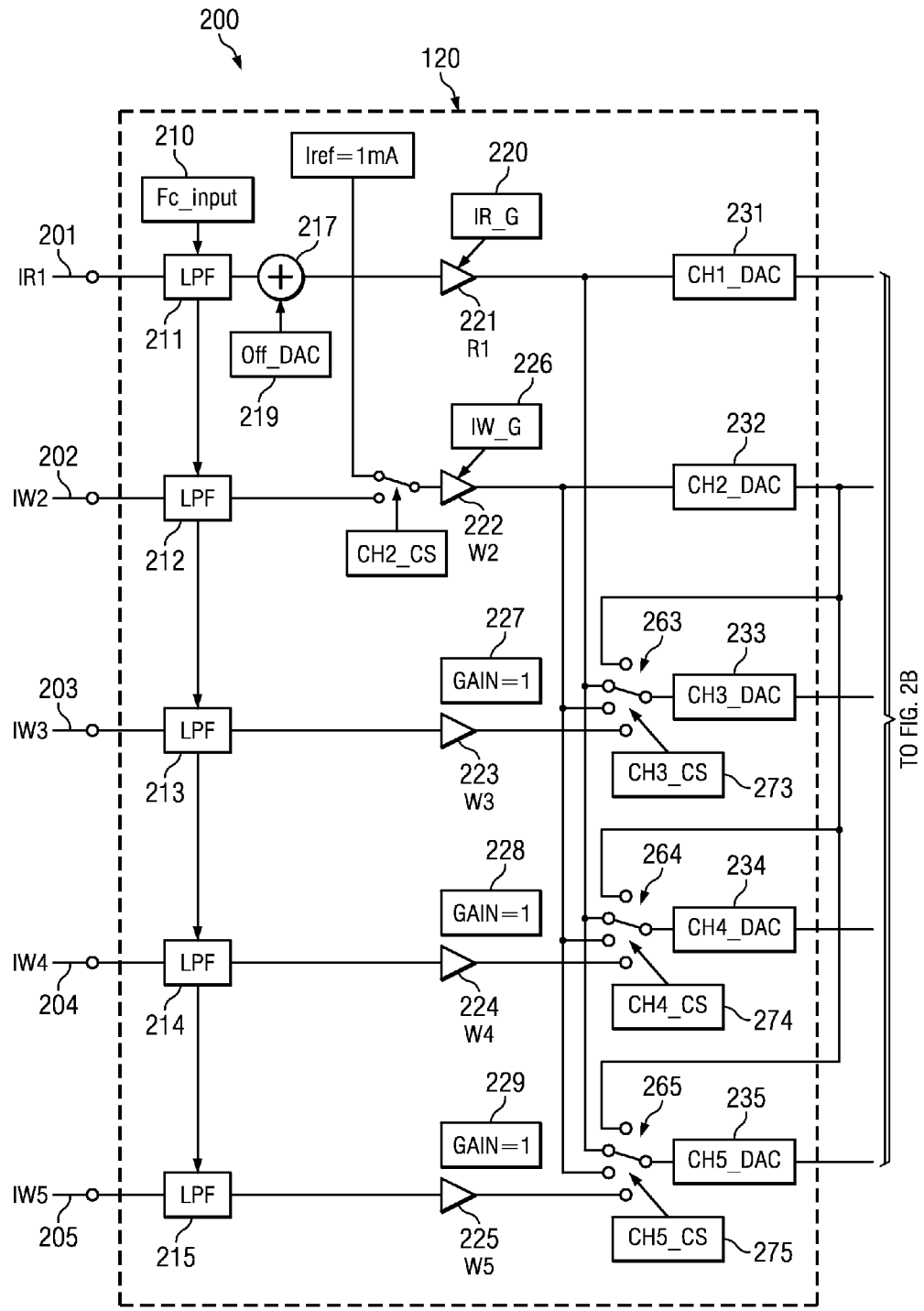
FIG. 2A-2B are block diagrams illustrating one implementation of the current gain control system.
Figure 2B:
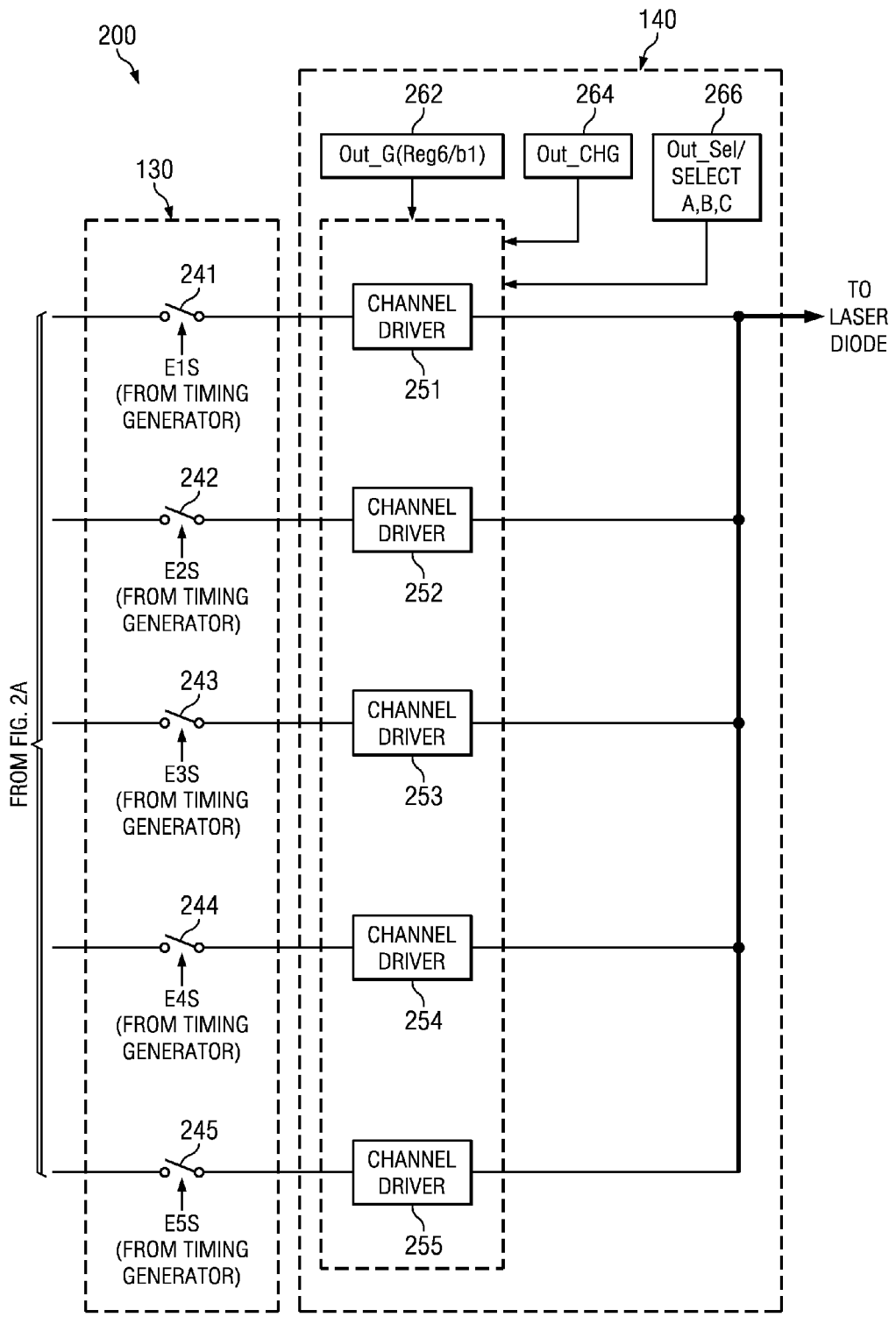

Turning now to FIGS. 2A-2B, these figures show a block diagram 200 of one implementation of the CGCS. In this implementation, there are five input channels 201-205, though other numbers of input channels are equally applicable. For example, there may be one implementation where a designer wants a reduction in the number of pin outs, which may result in including only input channels 201-202. Of these five channels, channel 201 is used when reading data from the optical media 117, while channels 202-205 are used when writing data to this optical media. For an alternative implementation, varying the number of input channels may necessarily vary the ratio of the read channel to the write channels.

Filters 211-215 connect to the input channels 201-205 and receive input current signals, or input signals, on each of the input channels. There is a one to one relationship between the input channel and the low pass filter, which may mean an implementation with only two input channels, may also have only two filters. In addition, another implementation may result from changing the channel to filter ratio to something other than one to one. The on chip filters 211-215's corner frequencies are adjustable by setting register 210; in one implementation, they are adjustable from approximately 3 KHz to approximately 675 KHz. While these filters receive input signals, they transmit filtered signals. Any numbers included in this application are for illustrative purposes only and numerous alternative implementations may result from selecting different quantitative values.

After the filter 211, the block diagram 200 includes an adder 217 that connects to a converter 219. This adder may be any type of adder and effectively sums the filtered signal from the filter 211 and the converted signal received from the converter 219. The converter may be one of several kinds of converters, such as a digital to analog converter (DAC). The converter 219 can compensate for any offset current that may result as the input signal associated with channel 201 traverses the current generator 120, the current switch 130, and finally the current driver 140. Since the CGCS has a wide variation of gain settings, canceling a DC offset internally generated by the LDD 110 is helpful. The signal resulting from the adder is an offset filtered signal. While this implementation only shows an adder and an offset converter for the read channel, other implementations are possible.

There is also a channel gain device for input channel; each channel gain device includes a gain block, alteration device, and a converter. The gain block 221 receives the offset filtered signal and applies a gain to this signal, which results in altering the gain associated with the input signal on channel 201. An alteration device 220 connects to this gain block and controls the amount of gain applied to the offset filtered signal. For example, the alteration device 220 may be a two-bit attenuator. By varying the bits of the alteration device 220 correspondingly changes the dynamic range of the gain for channel 201. Changing the dynamic range makes the LDD 110 with block diagram 200 particularly applicable to use with various types of media and optical pick up units. Moreover, the alteration devices 221, 226 enables dynamically adjusting the gains associated with both the channel 201 and the channel 202. Similarly, channels 203-205 also have corresponding gain blocks 223-225 and alteration devices 227-229. But these alteration devices have fixed gains associated with them; an alternative implementation may have a different number of fixed gain and dynamic gain alteration devices.

While the gain blocks 221-225 produce an intermediate gain signal, converters 231-235 connect to each of these blocks, receive these intermediate, gain signals and produce converted signals. These DAC converters can be any number of bits depending on the requirements such as die area, resolution etc.

Switches 263-265 selectively connect the converters 233-235 to the gain blocks 221-225; these switches receive enable signals from the blocks 273-275. Each of these switches receives an intermediate gain signal from its associated gain block. For example, the switch 263 can receive an intermediate gain signal from the gain block 223 associated with the input channel 203. In addition, these switches can also receive the following signals an intermediate gain signal from the gain block 222, an intermediate gain signal from the gain block 221, and a converted signal from the converter 232. The enable signals from blocks 273-275 control the positions of the switches 263-265 and may come from digital core. Using these switches when there are only two control outputs (e.g., removing drivers 253-255), the CGCS can set a suitable combination of input signal for channels 203-205 and set the suitable dynamic range of input current that produces good resolution.

After generating converted signals, the converters 231-235 transmit converted signals to the current switch 130. This current switch includes switches 241-245 associated with each of the input channels 201-205. As mentioned above, the current switch 130 decides which of the input channels should be turned on or turned off. For the channels that should be turned on, the current switch 130 makes those channels active. The timing generator 160 transmits enable signals for the switches 241-245 that either opens or closes the corresponding switch. These switches receive the converted signals and transmit switched signals.

The channel drivers 251-255 connect to the switches 241-245. As mentioned above, the current driver 140, which includes the channel drivers 251-255, is the last current gain stage and drives the laser diodes directly. In other words, these drivers transmit an output current signal that can be used in either turning on or turning off the light source 115, which may be a laser diode. This output current signal may be approximately the sum of the products of the input current of each channel and the current gain of each channel.

The drivers 251-255 receive signals from the selection device 266 and the registers 262-264. The register 262 may be a one bit register and dynamically adjust the gain for signals on each of the channels 201-205. Including this register means that the CGCS can now increase the channel gain as the light source 115, which can compensate for some of the age effects (e.g., power reduction) associated with the light source 115. While the register 262 may be a one bit register, other implementations may exist where this register has a different number of bits, such as a two-bit register. In addition to the register 262, the register 264 also allows a further adjustment of the channel gain by varying the gain between channels. Actually, this register may also be a one-bit register, and there may be two relative gain ratios between each channel. The CGCS may have one gain range setting bit to change the range to take care of the data writing speed on the disc. Changing these ratios may be helpful depending on the material of recording optical media 117. Since the block diagram 200 may be used with more than one light source 115, the selection device 266 enables selection of the light source that should receive the output signal. For example, this selection device may send one output current signal to a blue laser diode, while sending another output signal to a red laser diode.

Figures 3A, 3B, 3C:
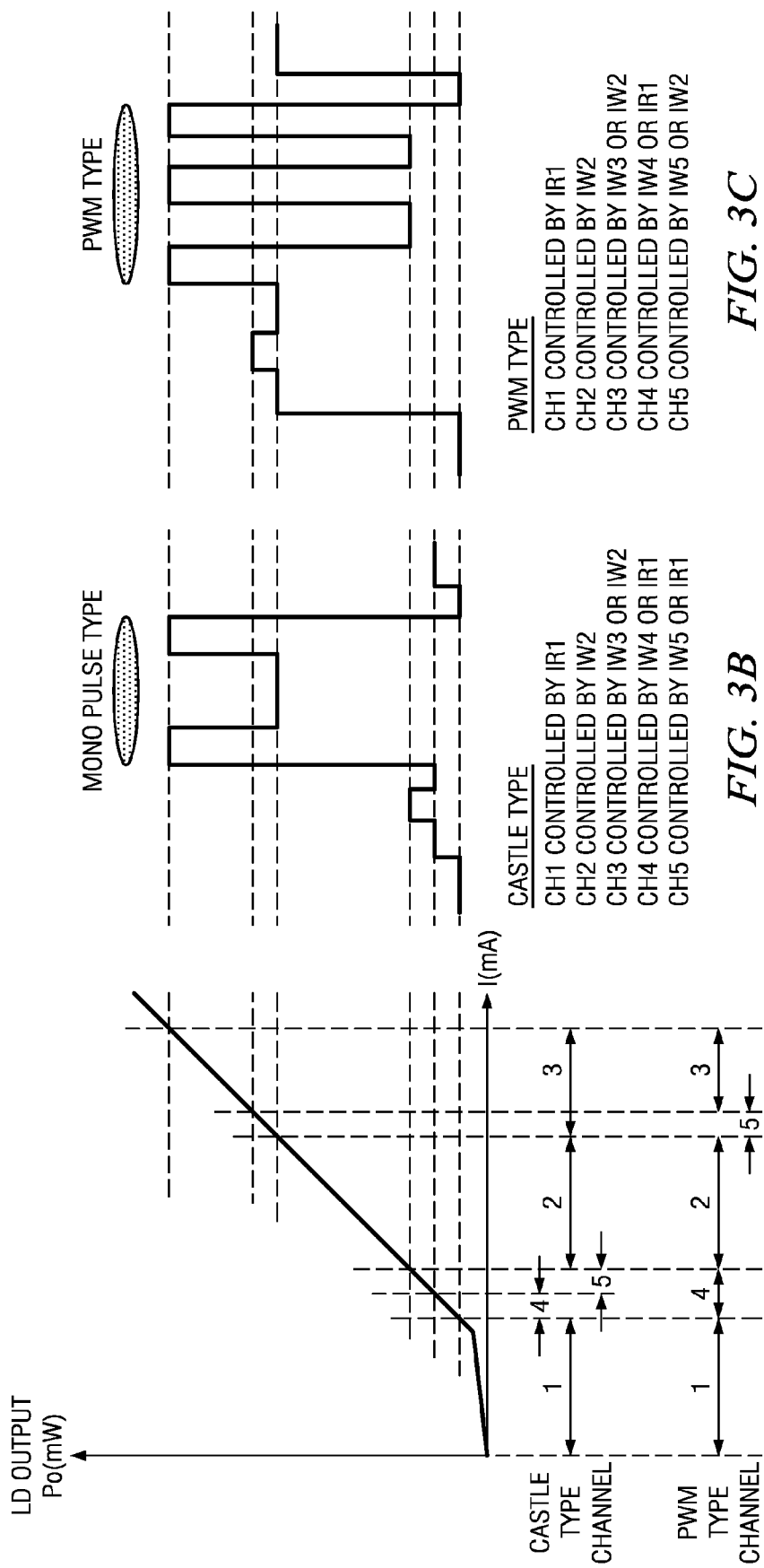
FIG. 3A is a graph illustrating output power variation with current.
FIGS. 3B-3C are graphs illustrating two different pulse types.

Turning now to FIGS. 3A-3C, FIG. 3A demonstrates how the output light power characteristics from the LDD 110 vary with output signal from the current driver 140. It is approximately linear for currents greater than the threshold current, which means that reductions in power can be compensated with increases in current. In other words, increasing the output current signal as the light source 115 ages can produce more power.

In addition, the CGCS may be used with various types of pulses. In case of a mono pulse structure (see FIG. 3B), one can apply a main write current on channel CH2, a peak pulse on channel CH3, a bias for cooling pulse on channel CH4, a PWM pulse within space position on channel CH5, and a Bias DC current on channel CH1. FIG. 3C shows a PWM pulse of write current and power. As described with reference to the mono pulse, the channels may be assigned in a similar manner for the PWM pulse. Some types of writing pulse structure combine the switching control of each channel and also change for each current by changing input current and gain setting. To keep good resolution, it will be better to change the current gain in LDD 110 because of the limitation of the input current range and resolution. By accommodating both pulse types, the CGCS can be used with various disk types. Moreover, the innovative CGCS can set an input current without many of the conventional gain setting variations.

While various embodiments of the current gain control system have been described, it may be apparent to those of ordinary skill in the art that many more embodiments and implementations are possible that are within the scope of this system. Although certain aspects of the current gain control system may be described in relation to specific techniques or structures, the teachings and principles of the present system are not limited solely to such examples. All such modifications are intended to be included within the scope, of this disclosure and the present current gain control system and protected by the following claim(s).

What is claimed is:

1. A current gain control system for independently altering gains associated with first and second input channels, comprising:
   first and second gain blocks respectively associated with the first and second input channels, wherein the first and second gain blocks transmit first and second gain signals in response to receiving first and second input signals;
   first and second converters adapted to be respectively coupled to the first and second gain blocks, the first and second converters operative for setting gains associated with the first and second input channel and for transmitting first and second converted signals in response to receiving the first and second gain signals; and
   first and second switches for selectively coupling the first and second converters to first and second channel drivers, respectively,
   wherein the first and second channel drivers transmit channel gain signals in response to receiving the first converted signal, and the channel gain signal allows control of the gain associated with the input channel, and controlling the gain for each channel enables varying power levels associated with each channel.

2. The current gain control system of claim 1, further comprising first and second filters respectively coupled to the first and second gain blocks, wherein the first and second filters transmit first and second filtered signals in response to receiving the first and second input signals.

3. The current gain control system of claim 2, wherein the first and second filters are low pass filters with a trimmable corner frequency.

4. The current gain control system of claim 1, further comprising:
   a third gain block coupled to a third converter operative for setting a third gain associated a third input channel, the third gain block operative for transmitting a third converted signal in response to receiving a third input signal; and
   a third switch for selectively coupling the third converter to the third channel driver, wherein the third channel driver transmits a third channel gain signal in response to receiving the third converted signal, and the third channel gain signal allows control of the gain associated with the third input channel.

5. The current gain control system of claim 1, wherein at least one of the gain blocks is dynamically adjustable and at least one has a fixed gain.

6. The current gain control system of claim 1, further comprising an output gain adjustment device operative for varying a dynamic range gain as a laser diode associated with current control system ages.

7. The current gain control system of claim 6, wherein the output gain adjustment device further includes alteration device for varying a gain ratio among the input channels.

8. The current gain control system of claim 1, further comprising an adder coupled between a low pass filter and one of the gain blocks.

9. The current gain control system of claim 8, further comprising an offset converter coupled to the adder wherein the offset converter is operative for compensating for an output offset converter.

10. A current gain control system for a laser diode, comprising:
- five filters respectively coupled to five input channels, wherein one filter is associated with one input channel;
- five channel gain devices respectively coupled to the five filters, wherein one channel gain device is associated with one filter; and
- five switches for selectively coupling the channel gain devices to five channel drivers, wherein one channel gain device is associated with one channel driver and each channel driver allows control of a gain for the associated input channel,
- wherein the current gain control system produces varying power levels in response to receiving a plurality of pulses.

11. The current gain control system of claim 10, wherein each channel gain device further comprises a gain block and a digital to analog converter.

12. The current gain control system of claim 11, wherein at least two of the channel gain devices further comprises an attenuator coupled to at least one of the gain blocks, and the attenuator for is operative for altering a first dynamic range that enables use with various types of media.

13. The current gain control system of claim 10, further comprising an output gain adjustment device operative for varying a dynamic range gain as a laser diode associated with current control system ages.

14. The current gain control system of claim 10, wherein the current gain control system is applicable to various types of optical pick up units.

15. An optical disk drive system, comprising:
- a controller monitoring an output power lever of laser diode and transmitting adjustment signals for varying the output power level;
- a driver operatively coupled to the controller for receiving the adjustment signals, the laser driver having a current gain control system for independently altering gains associated with first and second input channels, comprising:
  - first and second gain blocks respectively associated with the first and second input channels, wherein the first and second gain blocks transmit first and second gain signals in response to receiving first and second input signals;
  - first and second converters adapted to be respectively coupled to the first and second gain blocks, the first and second converters operative for setting gains associated with the first and second input channel and for transmitting first and second converted signals in response to receiving the first and second gain signals; and
  - first and second switches for selectively coupling the first and second converters to first and second channel drivers, respectively,
  - wherein the first and second channel drivers transmit channel gain signals in response to receiving the first converted signal, and the channel gain signal allows control of the gain associated with the input channel, and controlling the gain for each channel enables varying power levels associated with each channel.

16. The optical disk drive system of claim 15, further comprising an output gain adjustment device operative for varying a dynamic range gain as a laser diode associated with current control system ages.

17. The optical disk drive system of claim 15, wherein the output gain adjustment device further includes change gain device for varying gain ration among the input channels.

18. The optical disk drive system of claim 15, wherein the optical disk drive system is usable with media selected from the group consisting of CD, DVD, and blu-ray.

19. The optical disk drive system of claim 15, wherein at least one of the gain blocks is dynamically adjustable.

20. The optical disk drive system of claim 15, wherein the optical disk drive system is applicable to various types of optical pick up units.

* * * * *